2 Sheets—Sheet 1.

S. P. WEBBER.
GRINDING-MILLS.

No. 175,535. Patented March 28, 1876.

WITNESSES
Mary J. Utley
Emory H. Bates

INVENTOR,
Sumner P. Webber
By Chipman, Hosmer & Co.
Attorneys,

N. PETERS, PHOTO-LITHOGRAPHER, WASHINGTON, D. C.

2 Sheets—Sheet 2.

S. P. WEBBER.
GRINDING-MILLS.

No. 175,535. Patented March 28, 1876.

UNITED STATES PATENT OFFICE.

SUMNER P. WEBBER, OF CHARLOTTE, MICHIGAN.

IMPROVEMENT IN GRINDING-MILLS.

Specification forming part of Letters Patent No. 175,535, dated March 28, 1876; application filed January 8, 1876.

*To all whom it may concern:*

Be it known that I, SUMNER P. WEBBER, of Charlotte, in the county of Eaton and State of Michigan, have invented a new and valuable Improvement in Grinding-Mills; and I do hereby declare that the following is a full, clear, and exact description of the construction and operation of the same, reference being had to the annexed drawings, making a part of this specification, and to the letters and figures of reference marked thereon.

Figure 1:
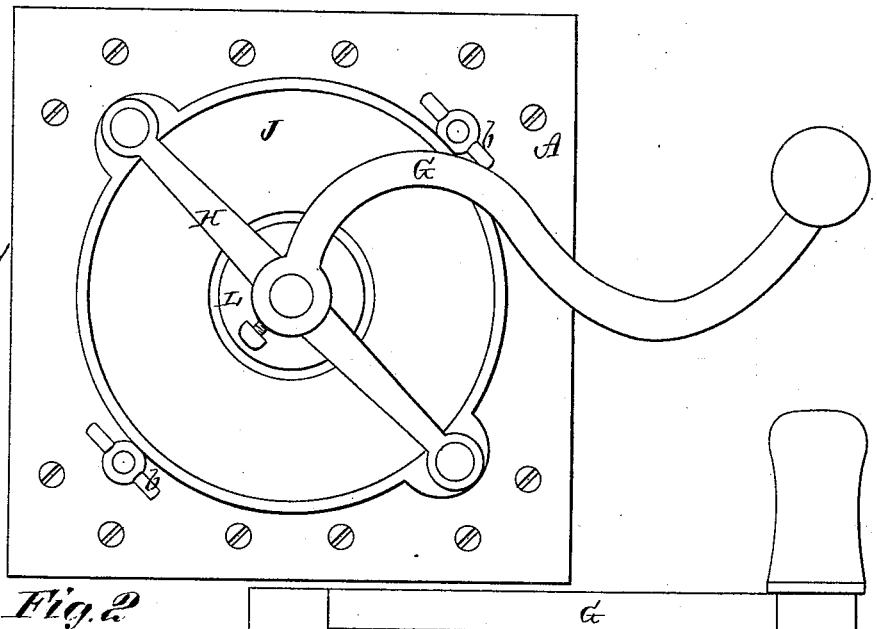
Figure 2:
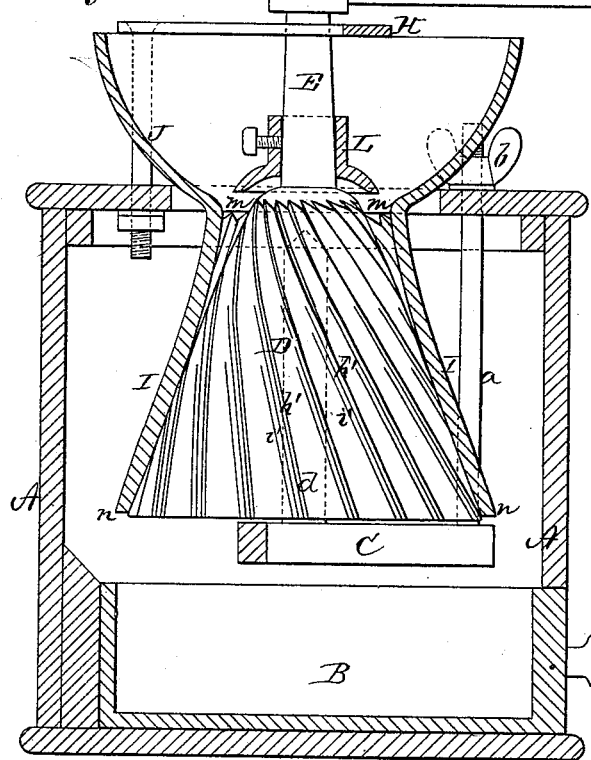
Figure 3:
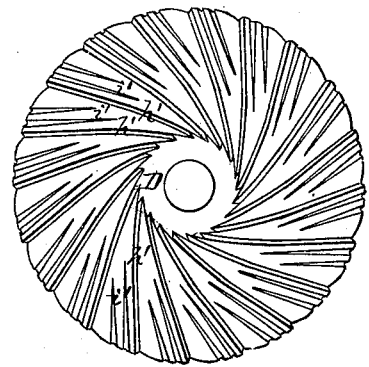
Figure 4:
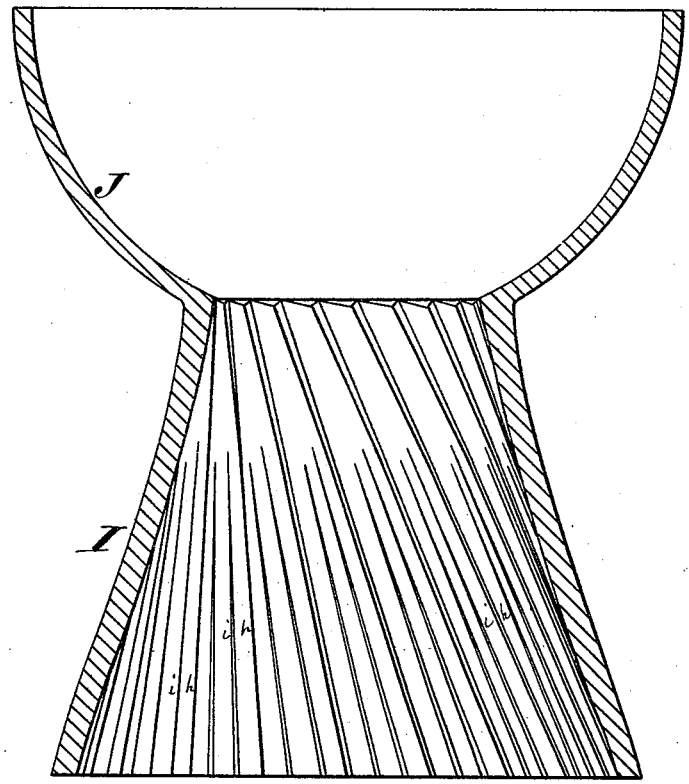

Figure 1 of the drawings is a representation of a plan view of my grinding-mill; and Fig. 2 is a vertical central sectional view of the same. Fig. 3 is a plan view of the grinding-runner, and Fig. 4 a vertical central sectional view of the hopper and hopper-shell.

The nature of my invention consists in the construction and arrangement of a mill for grinding coffee and spices, and which may, by the application of steam or other power, be used for grinding corn and cobs, without the corn being shelled, corn and oats and all kinds of coarse feed for stock, all as hereinafter more fully set forth.

In the annexed drawing, A represents the box or the case of the mill, with drawer B in the lower part. Within the box A is a bar, C, suspended by means of rods $a$ from the top of the box, said rods having thumb-nuts $b$ on their upper ends. From the center of the bar C projects a vertical spindle, $d$, upon which rests the conical grinding-runner D, having a shaft, E, projecting upward from its apex, said shaft passing through a cross-bar, H, and having a crank, G, on its upper end. Surrounding the grinder D is a conical shell, I, with hopper J cast in one piece. The shell I has on its interior surface a series of straight furrows, $h$, cut from the eye $m$ to the skirt $n$, with small narrow furrows $i$ $i$ cut on the land parallel with the main furrows, with proper draft to throw out and keep the mill from clogging. The runner D is, on its outer side, cut with the same number of large and small furrows, $h'$ and $i'$, with the draft opposite. The furrows are cut so that the square or track edge of the furrows draw from each other, the furrows having a true slant or inclined plane from the square or track edge to the surface of the shell and runner. The draft in a straight furrow being equal distributes whatever is to be ground over the grinding-surface of the mill equally, so that the labor is equal throughout the grinding-surface of the mill, and hence will grind faster and more evenly and better than the old system of grinding with the same power. Also, the square or track edges of the furrows crossing each other, so that the draft is from the said square or track edges, it follows that whatever is grinding passes from the furrow onto the land or grinding-surface of the mill without obstruction. The throat or eye $m$ of the mill is large at the top and graduating regularly to the bottom of the eye, thus admitting free passage into the mill, nothing being placed in the hopper to prevent it. The stem $d$ being fast to the bar or bridge-tree, passes to the top of the runner on the inside, resting on a pivot, makes the runner self-adjusting to the shell. The bar H across the top of the hopper serves to keep the runner from pressing against the sides of the shell, when turned by the handle or crank. On the shaft E is an adjustable collar or follower, L, for the purpose of regulating the feed.

What I claim as new, and desire to secure by Letters Patent, is—

1. The adjustable suspended bar C, having a central vertical spindle rigid therewith for supporting a conical grinding-runner, as specified.

2. The combination, substantially as hereinbefore described, of a vertically-adjustable suspended bar, having a central vertical spindle rigid therewith, a conical grinding-runner, having a shaft or stem projecting from its apex, a surrounding conical shell, and a suitable operating mechanism.

In testimony that I claim the above I have hereunto subscribed my name in the presence of two witnesses.

SUMNER P. WEBBER.

Witnesses:
 DYER F. WEBBER,
 F. C. HENDEE.